Patented Aug. 14, 1951

2,564,507

UNITED STATES PATENT OFFICE 2,564,507

SEPARATION OF SIDE-CHAIN HALOGEN-ATED ALKARYL COMPOUNDS

Benjamin B. Schaeffer, Niagara Falls, N. Y., assignor to Mathieson Chemical Corporation No Drawing. Application September 21, 1948, Serial No. 50,445

1 Claim. (Cl. 260—650)

This invention relates to a method for separating alkaryl compounds containing one or more side-chain halogen atoms from mixtures thereof with aromatic compounds free of side-chain halogen atoms but having an unsaturated hydrocarbon side chain. More particularly, it comprises the reacting of such side-chain halogenated contaminants of vinyl aromatics with a betaine and the separating of the reaction products from the vinyl aromatic.

The method is particularly valuable as applied in the separation of such alkaryl compounds from vinyl aromatic compounds which may or may not contain nuclear halogen atoms. Thus, it can be applied with excellent results in the separation of chloroethyl benzene from styrene, for example, or in the separation of chloroisopropyl benzene from alpha methyl styrene or in the separation of chloroethyl dichlorobenzene from dichlorostyrene.

Nuclear dichlorostyrenes, for instance, which are readily polymerizable to plastics having great commercial utility, are conveniently produced by the dehydrohalogenation of haloethyldichlorobenzene. Though styrene is much less readily polymerized and its polymers have much lower distortion temperatures than dichlorostyrenes and their polymers, it is likewise of considerable commercial utility. Styrene may be prepared by dehydrohalogenation of a haloethylbenzene. However, the reaction mixture resulting from the dehydrohalogenation in either case invariably contains substantial amounts of unreacted starting material. As compounds containing side-chain halogen adversely affect the rate and extent of polymerization, it is necessary to subject the dehydrohalogenation product to a treatment resulting in the removal of as much of the chloroethyl compound, for instance, as possible. A large proportion of the offending compound can be separated, of course, by fractional distillation, but in order to meet product specifications it is frequently necessary to carry the distillation treatment beyond commercially practicable limits. Even small amounts of the chloroethyl compound, having little, if any, effect on the polymerization of the styrene or dichlorostyrene, are objectionable where the polymeric material is to be employed in a molding operation carried out at elevated temperatures since it has been found that polymers prepared from monomers containing such amounts of the chloroethyl compound are prone to evolve hydrogen chloride during such operations causing corrosion of the equipment, particularly the metal parts thereof.

The process of the present invention is, as above noted, characterized by the adding to the contaminated vinyl aromatic material of the betaine, the reacting of the added betaine with the side-chain halogen-containing contaminant at a relatively low temperature, and separating the reaction product from the mixture. It is especially applicable to prefractionated vinyl aromatics containing not in excess of 1% of the contaminant.

It has previously been proposed to use certain organic nitrogen compounds, particularly certain organic amines for the purpose of dehydrohalogenating aromatic compounds containing chlorine in a suitable side chain having at least two carbon atoms for the production of vinyl aromatic compounds. Usually such reactions require a high temperature and they have sometimes been performed in the liquid and sometimes in the vapor phase. By this or other methods, the reaction to form the desired vinyl aromatic has been incomplete, and even under the best conditions, residual unreacted starting material containing side-chain chlorine has remained in the product. In view of that fact, it was not to be expected that minor amounts of side-chain halogen contaminants remaining in prefractionated vinyl aromatics could be removed, especially at relatively low temperatures, by the processes of the present invention.

I remove the reaction products from the vinyl aromatic, not by thermal decomposition, as suggested by the prior art in the manufacture of such vinyl aromatic compounds, but by washing with water or dilute alcohol, or by adsorption. By the process of the present invention, it is possible to remove minor amounts of such contaminants to such an extent that no objectionable quantities of hydrohalogen acid are liberated when the polymerized vinyl aromatic is molded.

The betaines generally have been found suitable for use in the present invention. They may be defined as a species of quaternary ammonium compounds which are internally neutralized and in which each molecule provides within itself the quaternary ammonium radical and the salt forming group which makes the quaternary ammonium salt and are described in detail at page 442 of volume I of the Third Edition of "Organic Chemistry" by Richter et al., as edited by Allott. Examples of betaines which have been used with particular advantage are those of trimethylamine, of octadecyldimethylamine and of lauryldimethylamine.

At little as the theoretical amount of the betaine based on the assumption that one mole reacts with each atom of side-chain halogen may be added to the contaminated vinyl aromatic mixture providing one mole of the betaine for each atom of halogen present in that form in the mixture. It is advantageous to add considerably more than the theoretical amount, as defined above, of the betaine in order to permit effective removal of the contaminant at a lower temperature and in a shorter time. As much as an equal volume of the betaine may be admixed with the vinyl aromatic to obtain particularly thorough removal of the contaminant under mild conditions. However, it is advantageous to avoid the use of such large proportions of betaine. As the invention is usually practiced on prefractionated vinyl aromatics containing less than about 0.1% of side-chain halogen by weight, I generally prefer to use from about .5% to 5% of the betaine on the weight of the vinyl aromatic.

The amount of side-chain halogen present in the vinyl aromatic mixture, for instance, in dichlorostyrene, may be determined as follows: a weighed sample of about 10 milliliters of the contaminated dichlorostyrene is admixed in a hundred milliliter flask with 10 milliliters of absolute ethanol. 10 milliliters of N-alcoholic potash is added and the mixture is refluxed for about 16 hours. The contents of the flask are then washed into an Erlenmeyer flask with hot water and neutralized to phenolphthalein using 30% acetic acid. Potassium chromate indicator solution is then added and the mixture titrated for chloride by the addition of standard silver nitrate solution. Ordinarily 0.1-N-silver nitrate is used, but for particularly low percentages of side-chain chlorine, 0.02-N or 0.05-N-silver nitrate may be preferred.

Where the desired proportion of the betaine does not completely dissolve in the vinyl aromatic, it may be desirable to agitate the mixture to obtain effective contact of the reactants. However, it is usually advantageous to add a small proportion of a lower molecular weight water-soluble aliphatic alcohol, for instance, methanol, ethanol, iso- or N-propanol, N-, iso- or tertiary butanol or tertiary amyl alcohol, in sufficient proportions to obtain a homogeneous solution. Other non-reactive mutual solvents which are soluble in water may be substituted, for instance, acetone, methyl ethyl ketone or acetonitrile.

Frequently the purification reaction proceeds satisfactorily at room temperature and the mixture of vinyl aromatic and betaine may be allowed to stand for a short time or overnight or longer. If it is desired to complete the purification more rapidly, the temperature may be suitably elevated for example to 65–70° C. for from a few minutes to several hours. The reaction is, with advantage, carried out at a temperature not substantially lower than room temperature (about 18° C.) nor higher than 100° C. Finally, the reaction mixture is washed several times with water or dilute alcohol or dilute acid to remove the reaction product of the betaine with the side-chain halogen contaminant from the vinyl aromatic. Where the side-chain halogen is initially low and not over 1% of the betaine based on the weight of the mixture, is added, it is feasible to omit the washing step and pass the mixture directly to an adsorption column. Under such conditions, preferably the mixture is passed directly, without intermediate washing, to an adsorption column and therein percolated through a bed of activated alumina by which the reaction product is preferentially adsorbed from the mixture. In place of the alumina, activated magnesia may be used.

Depending upon the amount of the contaminant present, it may be advantageous to wash a major portion of the reaction product from the mixture prior to the adsorption separation or in lieu thereof.

The treatment described may be repeated where it is desired to remove still further amounts of side-chain halogen containing contaminants of the vinyl aromatics. Where the reaction mixture has been washed with water to remove the reaction products, it is necessary to dry the vinyl aromatic, for example, by use of potassium carbonate or other suitable drying agent, for instance, caustic soda or potash, sodium sulfate, calcium chloride, anhydrous calcium sulfate, or anhydrous magnesium perchlorate. Where the adsorption column only is used to remove the reaction products, the monomer is ready to use after such treatment.

The practice of the invention is further illustrated by the following examples which, however, are not to be taken as in any way restrictive of the scope of the invention.

Example I

The betaine of lauryldimethylamine was prepared by neutralizing 33 grams of chloro-acetic acid in 12 milliliters of water with 13 grams of sodium hydroxide in 12 milliliters of water, addition of 75.3 grams of lauryldimethylamine and heating of the reaction mixture to 70–80° C. for 12 hours. The product was subsequently dried at 105° C.

Mixed nuclear dichlorostyrenes containing 0.056% of side-chain chlorine was admixed with the resultant betaine in the proportion of 15 grams per 100 grams of monomer. 50 milliliters of ethanol was added per 100 grams of monomer and the mixture heated at 65–70° C. for 1 hour. Thereafter the mixture was cooled, filtered and washed with water until neutral. The treated monomer was then dried with potassium carbonate and passed through a column of activated alumina. The resultant monomer was then found to contain 0.002% of side-chain chlorine, representing a reduction of approximately 96% in the contaminant.

Example II

The betaine of octadecyldimethylamine was prepared by a procedure similar to that described in the preceding example, substituting 104 grams of octadecyldimethylamine for the 75.3 grams of the lauryldimethylamine.

Mixed dichlorostyrene monomer containing 0.059% of side-chain chlorine was treated with this betaine in the proportion of one gram of the latter per 200 grams of monomer at 65–70° C. for 1 hour. The mixture was cooled, washed with 5% sulfuric acid and water, dried with anhydrous potassium carbonate and passed through a column of activated alumina. The side-chain chlorine content of the resulting monomer was 0.0015%, indicating a reduction in the contaminant of about 97%.

Example III 1 gram of the betaine used in the preceding example was added to 200 grams of the same dichlorostyrene monomer together with 100 milliliters of ethanol and the mixture allowed to stand at 25° C. for 1 hour. After washing, drying, and passing through an alumina column, the side-chain chlorine content of the monomer mixture was found to be 0.002%, indicating a removal of approximately 90% of the contaminant.

Example IV 1.5 grams of the betaine of lauryldimethylamine prepared as described in Example I was added to 150 grams of dichlorostyrene monomer containing 0.059% of side-chain chlorine and the mixture stirred at 65–70° C. for 1 hour. The mixture was cooled and passed through a column of activated alumina to obtain a monomeric mixture having a side-chain chlorine content of 0.002%.

Example V

The betaine of trimethyl amine was used to purify contaminated dichlorostyrene monomer by the procedure of the preceding example. The side-chain chlorine content of the monomer was reduced from 0.059 to 0.003%.

The process has been found to be especially useful and effective in the purification of nuclear dichlorostyrenes and, accordingly, the invention has been specifically illustrated with particular reference thereto. It is to be understood, however, that the invention is also applicable to the removing of alkaryl compounds containing side-chain halogen from other vinyl aromatics, notably styrene, paramethylstyrene, alpha, paramethylstyrene, parachlorostyrene, trichlorostyrenes and fluorostyrenes.

I claim:

A process for separating an alkaryl compound containing at least one side-chain halogen atom from a mixture thereof with an aromatic compound free from side-chain halogen but having an unsaturated hydrocarbon side chain, said mixture containing less than about 0.1% of side-chain halogen by weight, which comprises admixing at a temperature of from about 18 to not higher than 100° C. said mixture with from about 0.5 to about 5% of a betaine, based upon the weight of said aromatic compound, to form an addition product of said halogen compound and the betaine, and thereafter separating said addition product from the reaction mixture by directly passing the reaction mixture in contact with activated alumina.

BENJAMIN B. SCHAEFFER.

REFERENCES CITED

Degering: "An Outline of Organic Nitrogen Compounds"; pages 202–3 (1945).